DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1161

T880,004

PROCESS FOR PREPARING FILLED POLYMERS

Harold Boardman, Chadds Ford, Pa., assignor to Hercules Incorporated, Wilmington, Del., a corporation of Delaware

Filed Dec. 4, 1969, Ser. No. 882,335
Int. Cl. D01f *1/02*
U.S. Cl. 264—211
No Drawing. 7 Pages Specification

A process is taught for the preparation of filled polyolefins containing about 55 to 90% of a particulate inorganic filler. The process comprises extruding a blend of appropriate quantities of the polyolefin and the filler diluted with a sufficient quantity of wax to permit the material to be extruded into the shape desired, followed by extraction of the wax. The process is particularly useful with high viscosity polymers which ordinarily would not be amenable to extrusion without undergoing serious degradation. Extraction is accomplished by use of an inert solvent such as hydrocarbons, alcohols or ketones, which selectively extract wax and do not dissolve either the filler or the matrix polymer. It is found that if the filler is not soluble in the wax or the solvent, substantially none of the filler is removed in the wax extraction step.